(12) United States Patent
Tamura et al.

(10) Patent No.: US 10,454,679 B2
(45) Date of Patent: Oct. 22, 2019

(54) FILE SYSTEM SUPPORT FOR ROLLING KEYS ON FILE EXTENTS

(71) Applicant: Apple Inc., Cupertino, CA (US)

(72) Inventors: Eric B. Tamura, Sunnyvale, CA (US); Dominic B. Giampaolo, Lewiston, ME (US); Kelly B. Yancey, Pleasanton, CA (US)

(73) Assignee: Apple Inc., Cupertino, CA (US)

(*) Notice: Subject to any disclaimer, the term of this patent is extended or adjusted under 35 U.S.C. 154(b) by 323 days.

(21) Appl. No.: 15/274,706

(22) Filed: Sep. 23, 2016

(65) Prior Publication Data

US 2017/0359174 A1 Dec. 14, 2017

Related U.S. Application Data

(60) Provisional application No. 62/348,798, filed on Jun. 10, 2016.

(51) Int. Cl.
| | |
|---|---|
| *H04L 9/16* | (2006.01) |
| *G06F 21/60* | (2013.01) |
| *G06F 21/62* | (2013.01) |
| *G06F 16/16* | (2019.01) |
| *H04L 9/08* | (2006.01) |

(52) U.S. Cl.
CPC ............ *H04L 9/16* (2013.01); *G06F 16/164* (2019.01); *G06F 21/602* (2013.01); *G06F 21/6218* (2013.01); *H04L 9/0891* (2013.01)

(58) Field of Classification Search
CPC ....... H04L 9/16; H04L 9/0861; H04L 9/0891; G06F 17/30182; G06F 17/3012; G06F 21/602; G06F 21/6218
See application file for complete search history.

(56) References Cited

U.S. PATENT DOCUMENTS

| | | | | |
|---|---|---|---|---|
| 8,489,893 B2* | 7/2013 | Damian | .................... | H04L 9/06 380/277 |
| 8,542,823 B1* | 9/2013 | Nguyen | .............. | G06F 21/6218 380/42 |
| 8,856,554 B2* | 10/2014 | Yasaki | ...................... | G06F 1/26 713/189 |
| 8,984,097 B1* | 3/2015 | Shyam | .............. | G06F 17/30174 707/610 |
| 9,037,870 B1* | 5/2015 | Zheng | ................. | G06F 12/1408 380/273 |

(Continued)

*Primary Examiner* — Hee K Song
(74) *Attorney, Agent, or Firm* — Dickinson Wright RLLP

(57) ABSTRACT

This application sets forth a key rolling technique for a file system of a computing device. The key rolling technique allows for files to be transparently re-encrypted in a background process while still allowing applications to access the files being re-encrypted. During re-encryption, at least one file extent of a file is decrypted using a current key for the file extent and re-encrypted using a new key for the file extent. Moreover, the file extent can be relocated to another location in memory during re-encryption to enhance accessibility and crash protection features. Metadata associated with the file can be updated to include information pertaining to both the location of the re-encrypted file extent as well as the new key that can be used to decrypt the re-encrypted file extent. In this manner, the metadata can be used to properly construct a complete file when the file needs to be accessed.

20 Claims, 7 Drawing Sheets

(56) References Cited

U.S. PATENT DOCUMENTS

| | | | |
|---|---|---|---|
| 10,032,038 B2* | 7/2018 | Suter | G06F 21/6209 |
| 2002/0157016 A1* | 10/2002 | Russell | G06F 21/6218 |
| | | | 726/26 |
| 2007/0058801 A1* | 3/2007 | Plotkin | H04L 9/088 |
| | | | 380/28 |
| 2007/0079119 A1* | 4/2007 | Mattsson | G06F 21/602 |
| | | | 713/164 |
| 2009/0031128 A1* | 1/2009 | French | G06F 21/6218 |
| | | | 713/164 |
| 2011/0191595 A1* | 8/2011 | Damian | G06F 12/14 |
| | | | 713/189 |
| 2011/0252234 A1* | 10/2011 | De Atley | H04L 9/0891 |
| | | | 713/165 |
| 2012/0246485 A1* | 9/2012 | Norimoto | G06F 21/6209 |
| | | | 713/189 |
| 2013/0034229 A1* | 2/2013 | Sauerwald | H04L 9/0822 |
| | | | 380/46 |
| 2014/0013112 A1* | 1/2014 | Cidon | G06F 21/6218 |
| | | | 713/165 |
| 2014/0281514 A1* | 9/2014 | Erofeev | G06F 21/6218 |
| | | | 713/165 |
| 2015/0161409 A1* | 6/2015 | Szebeni | G06F 21/6272 |
| | | | 713/165 |
| 2015/0186668 A1* | 7/2015 | Whaley | G06F 16/16 |
| | | | 713/156 |
| 2015/0207623 A1* | 7/2015 | Pandian | H04L 9/0891 |
| | | | 713/165 |
| 2016/0321460 A1* | 11/2016 | Suter | G06F 21/6209 |
| 2017/0285978 A1* | 10/2017 | Manasse | G06F 3/0619 |

\* cited by examiner

FILE SYSTEM SUPPORT FOR ROLLING KEYS ON FILE EXTENTS

CROSS-REFERENCE TO RELATED APPLICATION

The present application claims the benefit of U.S. Provisional Application No. 62/348,798, entitled "FILE SYSTEM SUPPORT FOR ROLLING KEYS ON FILE EXTENTS" filed Jun. 10, 2016, the content of which is incorporated herein by reference in its entirety for all purposes.

FIELD

The described embodiments relate generally to key-rolling techniques for file systems. More particularly, the described embodiments relate to key-rolling techniques for transparently re-encrypting one or more file extents of a file in a file system by iteratively encrypting the one or more file extents and relocating them to different locations in storage.

BACKGROUND

The overall availability of personal information of individuals has increased in recent years due to the proliferation of computing devices (e.g., smartphone devices, tablet devices, laptop devices, etc.). Notably, concern over the security of such personal information resulted in the implementation of traditional encryption techniques that make the personal information virtually inaccessible without possession of proper encryption keys (e.g., encryption keys based on user passcodes). Although, in general, these traditional encryption techniques could previously thwart malicious parties from accessing personal information on computing devices, modern hacking techniques present new challenges that need to be addressed. For example, malicious software can be utilized to rapidly generate "guess" passwords and enter them on a computing device as a brute-force technique for eventually guessing the correct password assigned on the computing device. As a result, computing devices having personal information protected by traditional encryption techniques/weak passcodes can be compromised and subject users to data loss, identity theft, and the like.

SUMMARY

One attempt to strengthen the overall security of a given computing device can involve periodically updating one or more encryption keys that are used to encrypt data within the computing device, referred to herein as "key rolling." For example, an original encryption key used to encrypt data on a computing device can be used to decrypt the data, whereupon a new encryption key can be used to re-encrypt the data, thereby rendering the data inaccessible to any party that may inappropriately possess the original encryption key. Although this approach can help foil malicious attacks, the approach does not employ recent advancements in file system structures that can provide higher levels of security. For example, some file systems can implement encryption schemes where file extents of which each file is comprised are encrypted using different encryption keys, referred to herein as a "multi-encryption key environment." Notably, applying the foregoing key-rolling technique to such a multi-encryption key environment can substantially increase the overall security of a computing device. Moreover, the recent advancement in hardware performance/scheduling can enable key rolling to be efficiently implemented without disrupting the overall operability of the computing device. For these reasons, there exists a need for a key rolling technique that can efficiently manage and update keys within a multi-encryption key environment.

Accordingly, representative embodiments set forth herein disclose various techniques for re-encrypting file extents of files at computing devices. According to some embodiments, a method for re-encrypting file extents of files at a computing device can include the steps of (1) receiving a request to update an encryption scheme applied to a file, where the file is comprised of a plurality of file extents, (2) identifying, based on metadata associated with the file, at least one file extent of the plurality of file extents that is encrypted using a first encryption key that is to be updated, (3) decrypting the at least one file extent using the first encryption key, (4) encrypting the at least one file extent using a second encryption key that is different than the first encryption key, and (5) updating the metadata to indicate that the at least one file extent is encrypted with the second encryption key.

Other embodiments include a non-transitory computer readable storage medium configured to store instructions that, when executed by a processor included in a computing device, cause the computing device to carry out the various steps of the foregoing method. Further embodiments include a computing device that is configured to carry out the various steps of the foregoing method.

Other aspects and advantages of the invention will become apparent from the following detailed description taken in conjunction with the accompanying drawings that illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
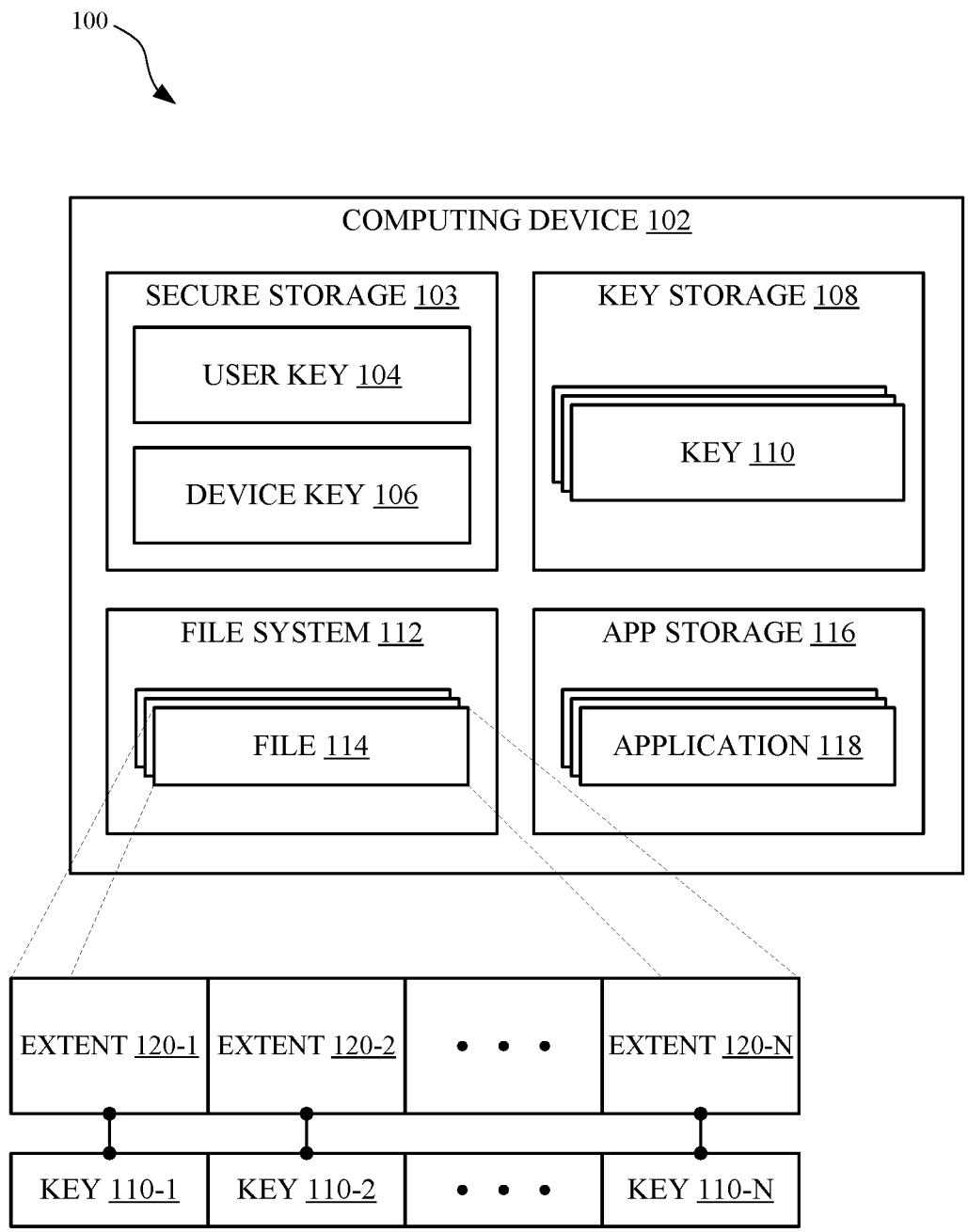
FIG. 1 illustrates a conceptual diagram for a computing device that can be configured to perform the key rolling techniques described herein, according to some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Encryption of data has helped to securely establish a global network of computing devices in which sharing of the data can be accomplished with minimal risk of the theft or fraud. However, the popularity of many computing devices such as smartphones, tables, laptops, etc.—combined with the prevalence of hacking—has established a need to make the data more secure. Despite efforts and investments made to provide more secure computing device architectures, data can be compromised by malicious software designed to discover keys that are used to secure the data. In some cases, the only limiting variable for malicious software to gain access to protected data is time (e.g., brute-force attacks).

One approach that can be used to help thwart brute-force attacks is to periodically re-encrypt data on a computing device with a new key. In this manner, fraud and theft of data can be avoided by generating a new key for a computing device before the malicious software has the time to guess and input a current key. However, decrypting files on a computing device using a current key and re-encrypting the files with a new key—referred to herein as "global key rolling"—has drawbacks. Specifically, global key rolling can inhibit processor performance and consume power because of the amount of data that is processed. As a result, overall user satisfaction can be degraded.

To address the foregoing issues, the embodiments described herein provide key-rolling techniques for transparently re-encrypting one or more file extents of a file. In particular, the key-rolling techniques involve iteratively encrypting the one or more file extents and relocating them to different locations in storage. According to some embodiments, a key rolling technique can be transparently performed by enabling all file extents of a file to be read-accessible by a program on a computing device even as they are being re-encrypted with a new key. According to some embodiments, to achieve this functionality, a file extent of the file can first be copied into a new area of memory, thereby enabling the file extent to remain read-accessible even while the copied file extent is being decrypted using a current key and re-encrypted with the new key. In this manner, the re-encryption process will be transparent to a user or process of the computing device regardless of the size/numbers of file extents being re-encrypted. Moreover, as each file extent is re-encrypted on an individual basis, virtually all file extents of the file will be write-accessible during the re-encryption process as only individual file extents will be locked from modification as they are being re-encrypted.

A key rolling program on the computing device can track the progress of the re-encryption of file extents of a file by updating metadata associated with the file. According to some embodiments, the metadata can indicate how the file extents of a file are currently encrypted. For example, when initiating a key rolling process for a file, the metadata can be used to identify one or more file extents that should be re-encrypted with a new key in conjunction with the key rolling process. Furthermore, as the key rolling process progresses through the identified one or more file extents, the metadata can be updated to indicate the changes made to the identified one or more file extents. For example, the metadata can be updated to indicate the new key used to re-encrypt each of the identified one or more file extents, as well as the new memory locations into which the one or more file extents are located after they are re-encrypted. Additionally, when the key rolling process for the file involves re-encrypting all file extents of the file with the new key, the metadata for the file can include a simplified value that indicates all file extents of the file are encrypted with the new key, thereby reducing the overall size of the metadata.

Additionally, in some instances it can be beneficial to perform key rolling in a non-sequential manner such that certain file extents of a file are skipped or addressed in an out-of-order fashion. For example, if key rolling is to be performed on a file that is being used by an application, the key rolling program can skip file extents of the file that are being accessed/modified by the application. In some embodiments, a file can represent a group file that allows a group of individuals to access and edit the file. In particular, the file can be encrypted with multiple keys and each person in the group can have access to the multiple keys. When updates are made to the file by one or more individuals in the group, the updated portion (i.e., modified file extents) of the file can be encrypted with one or more existing keys. However, if a person leaves the group and updates are made to the file subsequent to the person leaving the group, a new key can be generated and the updated file extents of the file can be encrypted with the new key according to the key rolling processes described herein.

Additionally, the key rolling program can include a reserve operation for reserving portions of memory for newly encrypted (i.e., re-encrypted) file extents of a file. More specifically, in order to protect against data loss that can occur from power loss or computer crashes, the key rolling program can first copy file extents to the reserved portion of memory, thereby maintaining the original file extents as the re-encryption process is carried out. As previously described herein, the metadata associated with the file can be updated to indicate where the re-encrypted file extents are stored in memory, as well as the encryption keys that are used to re-encrypt the file extents. For example, the metadata can indicate (i) before re-encryption, that one or more file extents are encrypted with a current key and stored in particular locations, and (ii) after re-encryption, that the one or more file extents are re-encrypted with a new key and stored in new locations. As a result, any applications attempting to access the file can identify the appropriate locations/keys of the file extents of the file by referencing the metadata associated with the file.

Additionally, the key rolling program can be scheduled to execute at different times. For example, the key rolling program can be scheduled to execute when a computing device operating the key rolling program is connected to an external power supply (and power consumption is less of a concern). The key rolling program can also be scheduled to execute when the computing device has entered an idle or locked mode (where a user of the computing device will not be disrupted). In this manner, the impact of the key rolling program on the power and processing efficiency of the computing device can be mitigated. However, it is noted that the key rolling program can be scheduled to execute at any suitable time, including when a user is actively operating the computing device. In such a configuration, the key rolling program can function as a background process for transparently re-encrypting a file system of the computing device, as described herein.

It is noted that the key rolling techniques described herein can utilize various encryption techniques to enhance security. For example, a key rolling operation can involve updating an encryption key that is used to encrypt one or more files. In another example, a key rolling operation can involve updating an encryption scheme that is used to encrypt one or more files. These and other embodiments are discussed below with reference to FIGS. 1-6; however, those skilled in the art will readily appreciate that the detailed description given herein with respect to these figures is for explanatory purposes only and should not be construed as limiting.

FIG. 1 illustrates a conceptual diagram 100 for a computing device 102 that can be configured to perform the key rolling techniques described herein, according to some embodiments. According to some embodiments, the computing device 102 can represent a smartphone, tablet, laptop, desktop, display, watch, media player, or any other computing device 102 suitable for storing encrypted data. According to some embodiments, the computing device 102 can include a secure storage 103 and a key storage 108, which can be components of a secure processor (not illustrated in FIG. 1) included in the computing device 102. According to some embodiments, the secure processor can be separate and distinct from one or more central processing units (CPUs) (not illustrated in FIG. 1) included in the computing device 102, where the secure processor is configured to implement/operate in a sandboxed environment in order to enhance overall security. For example, specific daemons of an operating system (OS) executing on the computing device (by way of the CPU) can be permitted to interface with the secure processor, whereas other applications (e.g., user applications) executing by way of the OS can be prohibited from interfacing with the secure processor. In this manner, the features implemented by the secure processor—as well as the data managed by the secure processor (e.g., encryption keys)—can remain in a protected environment to maintain overall security while enabling the embodiments described herein to be implemented.

The data stored by the computing device 102 can be encrypted using a user key 104 and/or a device key 106 that are stored within a secure storage 103. The user key 104 can be a key that is created by a user or is otherwise uniquely associated with the user. Additionally, the user key 104 can be stored by the computing device 102 or provided to the computing device 102 through an interface of the computing device 102. In this manner, the user can be required to enter the user key 104 before the user can access data (e.g., files 114 of the file system 112) that is encrypted by the user key 104. The computing device 102 can also include a device key 106, e.g., a hardware key provided by a manufacturer of the computing device 102. In this manner, the device key 106 can be unique to each computing device 102. In some embodiments, both the device key 106 and the user key 104 are used to encrypt data, e.g., the device key 106 and the user key 104 can be combined/modified in any manner to produce a combined key. In other embodiments, the device key 106 can be used to encrypt the user key 104, and the resulting encrypted user key can be used to encrypt certain files 114 in the file system 112 of the computing device 102.

For example, certain files 114 that are used during a startup of the computing device 102 can be encrypted by the device key 106 and/or the user key 104, thereby rendering certain features of the computing device 102 inaccessible until a proper authentication occurs.

As also shown in FIG. 1, a key storage 108 can be provided in the computing device 102 for storing keys 110 that can be used to encrypt files 114 of the file system 112 according to different policies associated with the keys 110. For example, some keys 110 can only be made available after a user has activated (e.g., logged into) the computing device 102 for the first time. In this manner, any files encrypted with such keys 110 will only be available after the computing device 102 is activated. Additionally, some keys 110 can only be made available after the computing device 102 has connected to an external device, e.g., a network device. As a result, any files encrypted with such keys 110 will only be available when the computing device 102 is connected to the external device.

Encrypting the files 114 in the foregoing manner can limit the availability of the files 114 to applications 118 stored in an application storage 116 of the computing device 102. According to some embodiments, each application 118 can request one or more keys 110 from the key storage 108 before accessing files 114 from the file system 112. The granting of keys 110 to applications 118 and the deletion of keys 110 from memory can be based on the policies in place for each key 110. This prevents malicious applications from being loaded on the computing device 102 and thereafter accessing the file system 112 without first obtaining a key 110. Unfortunately, some malicious applications can be designed to frequently make attempts to access the files 114 by guessing key values. In some cases, given a long enough time frame, the malicious applications can succeed. Therefore, it can be beneficial for the computing device 102 to be configured to periodically generate new keys 110 to replace current keys 110. To implement this functionality, a key rolling program on the computing device 102 can be used to periodically re-encrypt files 114 in the file system 112 with new keys 110.

As shown in FIG. 1, each file 114 can be comprised of one or more file extents 120, and each file extent 120 can be encrypted by the same key 110 or a different key 110. Accordingly, to implement the key rolling techniques described herein, the key rolling program can initially decrypt at least one file extent 120 of a file 114 using a current key 110 (that is currently used to encrypt the at least one file extent 120), re-encrypt the at least one file extent 120 using a new key 110, and thereafter store the re-encrypted file extent 120 in different location.

Figure 2:
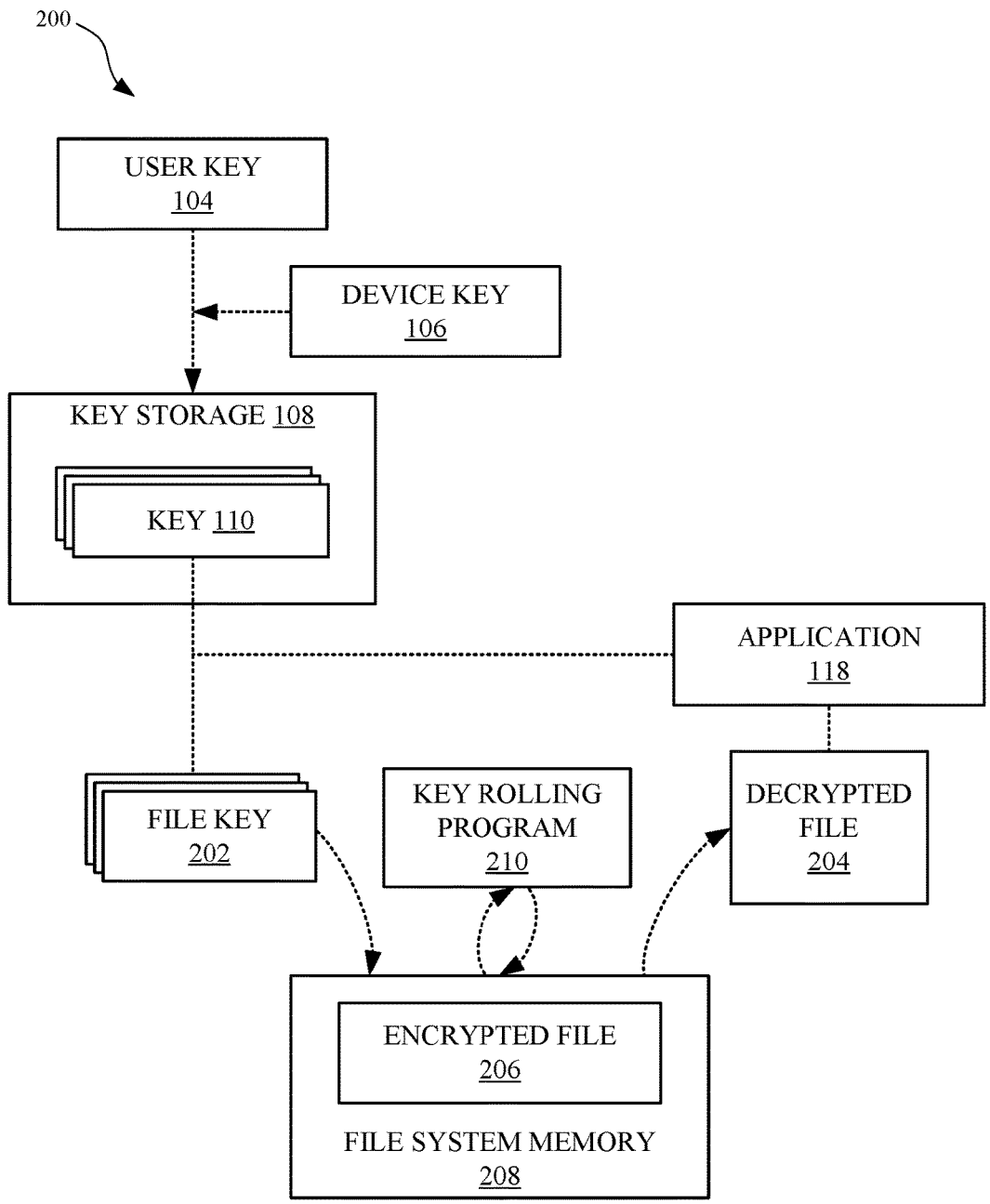
FIG. 2 illustrates a conceptual diagram of an application accessing an encrypted file, according to some embodiments.

FIG. 2 illustrates a conceptual diagram 200 of an application accessing an encrypted file, according to some embodiments. Specifically, FIG. 2 provides an example of a flow that can occur while a key rolling program 210 is executing as a background daemon. For example, an application 118 can issue a request to decrypt an encrypted file 206 in a file system memory 208 to produce a decrypted file 204. According to some embodiments, gaining access to one or more file keys 202 that can unlock the encrypted file 206 can require the user key 104 and the device key 106 to first unlock the key storage 108. When the key storage 108 is unlocked by the user key 104 and device key 106, the key storage 108 can provide various keys 110 in response to requests received from the application 118. For example, the file keys 202 can be provided by the key storage 108 to decrypt different file extents 120 of the encrypted file 206 to produce the decrypted file 204. The decrypted file 204 can thereafter be accessible to the application 118 while the key rolling program 210 is operating on different file extents 120 of the encrypted file 206, as described in greater detail herein. In this manner, the key rolling program 210 is transparent to the application 118 as the application 118 remains able to access the encrypted file 206 even when the key rolling program 210 is operating on (i.e., re-encrypting) different file extents 120 of the encrypted file 206.

Figure 3A:
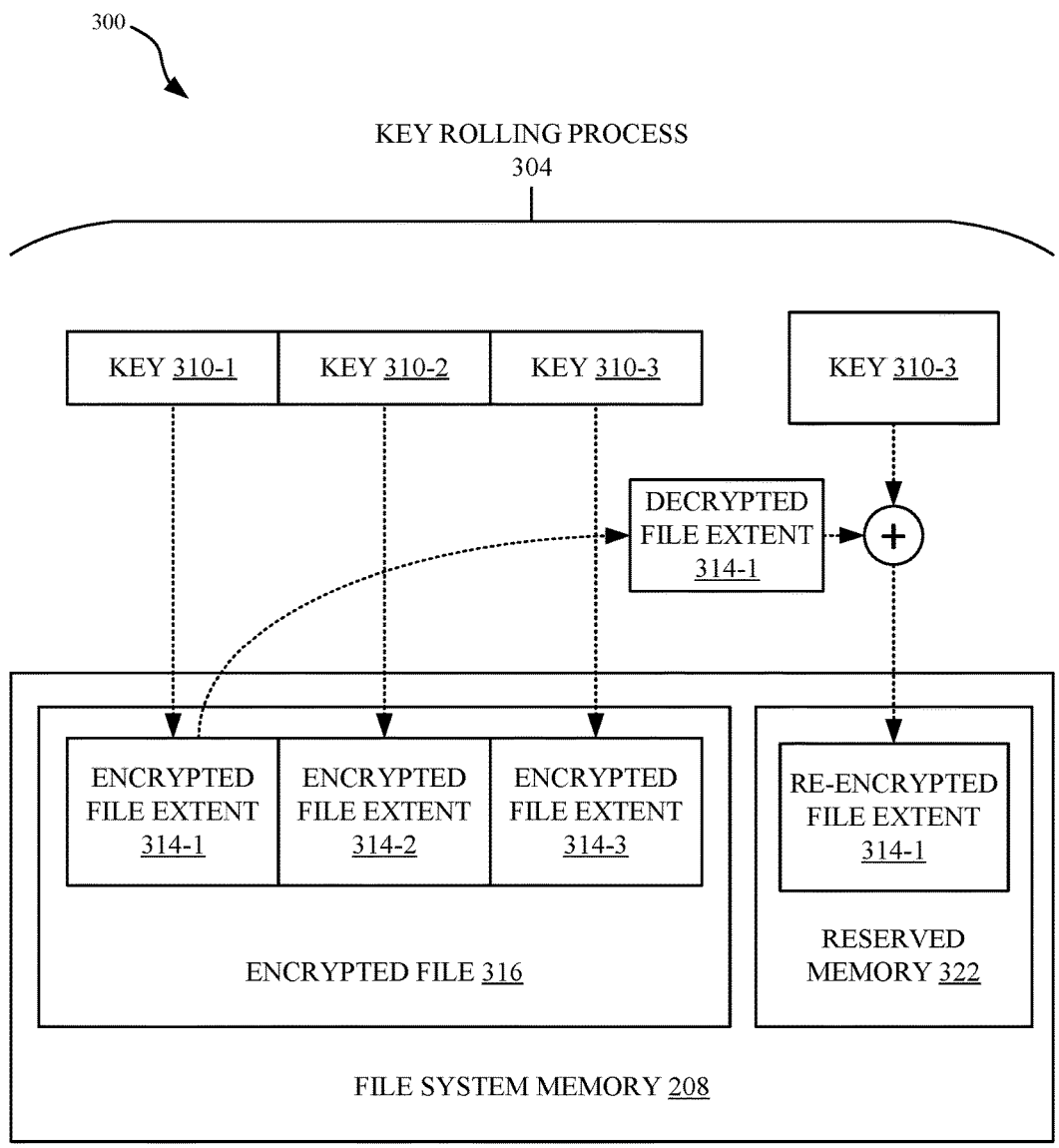
FIGS. 3A-3B illustrate conceptual diagrams of an example key rolling process operating on an encrypted file, according to some embodiments.
Figure 3B:
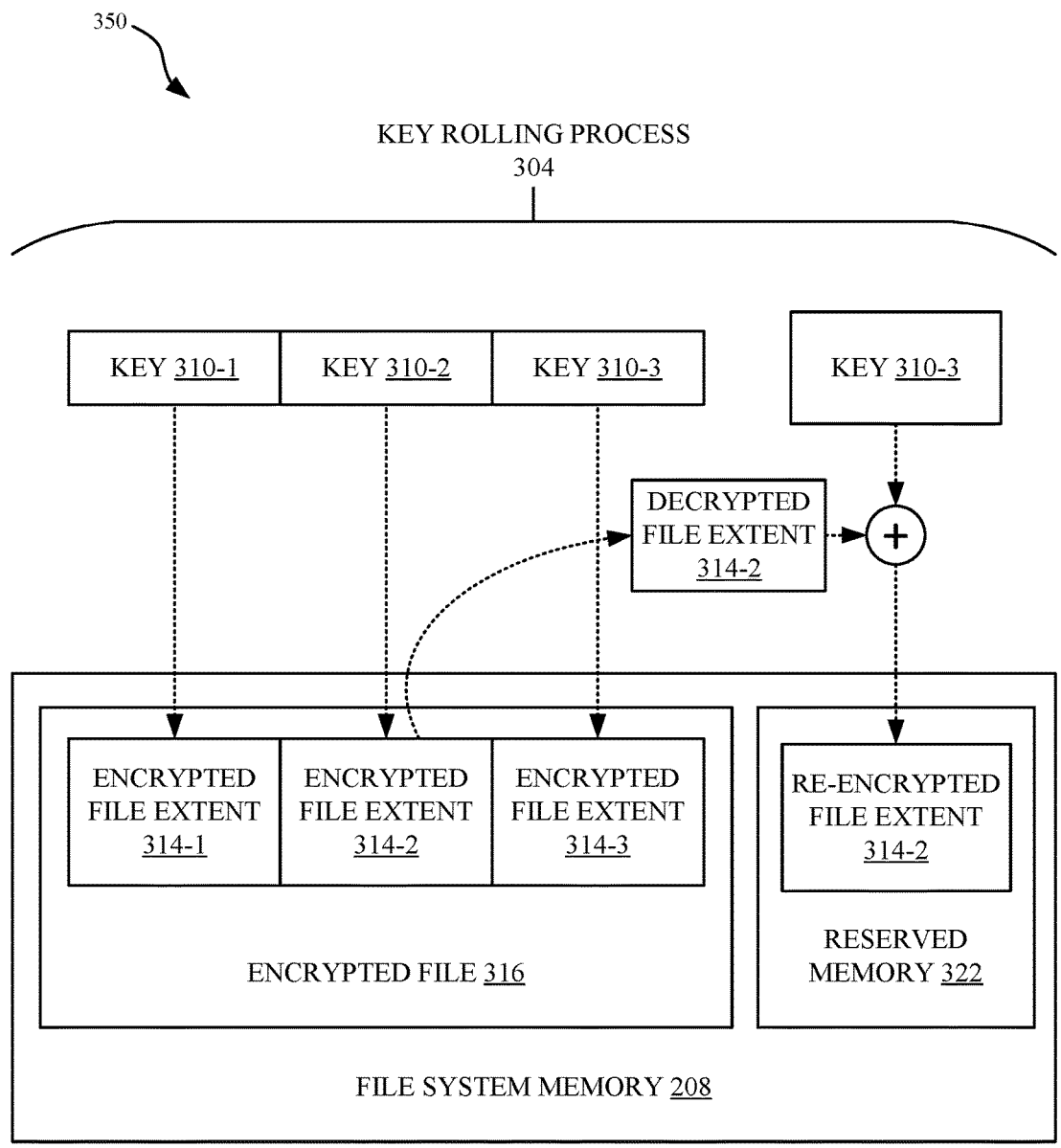

FIGS. 3A-3B illustrate conceptual diagrams 300 and 350 of an example key rolling process 304 operating on an encrypted file 316, according to some embodiments. As shown in FIG. 3A, the encrypted file 316 is comprised of three different encrypted file extents 314: encrypted file extent 314-1, encrypted file extent 314-2, and encrypted file extent 314-3. As also shown in FIG. 3A, each file extent 314 is respectively encrypted using a different key 310. For example, encrypted file extent 314-1 is encrypted using key 310-1, encrypted file extent 314-2 is encrypted using key 310-2, and encrypted file extent 314-3 is encrypted using key 310-3. As described in greater detail below, the example key rolling process 304 involves performing a key rolling operation that involves re-encrypting the encrypted file extent 314-1 and the encrypted file extent 314-2 with the key 310-3 (used to encrypt the encrypted file extent 314-3). However, it is noted that the encrypted file 316 illustrated in FIGS. 3A-3B is merely exemplary and that that encrypted file 316 can be comprised of any number of encrypted file extents 314 that are encrypted using one or more keys 310. Moreover, it is noted that the key rolling process can involve re-encrypting any number of file extents using any number of keys.

As illustrated in FIG. 3A, the example key rolling process 304 first involves re-encrypting the encrypted file extent 314-1 using the key 310-3, where the key 310-3 also is used to encrypt the encrypted file extent 314-3. The key rolling process 304 can involve obtaining the key 310-1 for accessing the encrypted file extent 314-1 of the encrypted file 316. Once obtained, the key 310-1 can be used to decrypt the encrypted file extent 314-1 to produce a decrypted file extent 314-1. In turn, the key rolling process 304 can re-encrypt the decrypted file extent 314-1 using the key 310-3 to produce a re-encrypted file extent 314-1. It is noted that each of the keys described herein can represent a single key, a key encrypted using one or more keys, and/or one or more keys encrypted with additional data (e.g., a salt value).

As shown in FIG. 3A, the re-encrypted file extent 314-1 can be stored in reserved memory 322. According to some embodiments, the reserved memory 322 represents a portion of the file system memory 208 that can be initially reserved at the beginning of the key rolling process 304 in order to mitigate fragmentation of the encrypted file 316. Thereafter, the previous location of the encrypted file extent 314-1 can be marked as unused space in the file system memory 208. However, in some embodiments, the re-encrypted file extent 314-1 can occupy the same location in memory as the encrypted file extent 314-1. When the key rolling process 304 completes the re-encryption of the file extent 314-1, the key rolling process 304 can proceed to the next stage of the process, which is described below and illustrated in conjunction with FIG. 3B.

As illustrated in FIG. 3B, the conceptual diagram 350 involves the example key rolling process re-encrypting the encrypted file extent 314-2 using the key 310-3. The key rolling process 304 can involve obtaining the key 310-2 for accessing the encrypted file extent 314-2 of the encrypted file 316. Once obtained, the key 310-2 can be used to decrypt the encrypted file extent 314-2 to produce a decrypted file extent 314-2. In turn, the key rolling process 304 can re-encrypt the decrypted file extent 314-2 using the key 310-3 to produce a re-encrypted file extent 314-2. As shown in FIG. 3B, the re-encrypted file extent 314-2 can be stored in reserved memory 322. Thereafter, the previous location of the encrypted file extent 314-2 can be marked as unused space in the file system memory 208.

It is noted that the key rolling process 304 can, in some situations, adjust the manner in which the different file extents of a file are re-encrypted. For example, if a battery of the computing device 102 is low or a processor of the computing device 102 is inundated with a large number of scheduled tasks, then the number of targeted file extents can be reduced. Thereafter, when the battery is no longer low or the processor has a reduced number of scheduled tasks, the number of targeted file extents can be increased.

Figure 4:
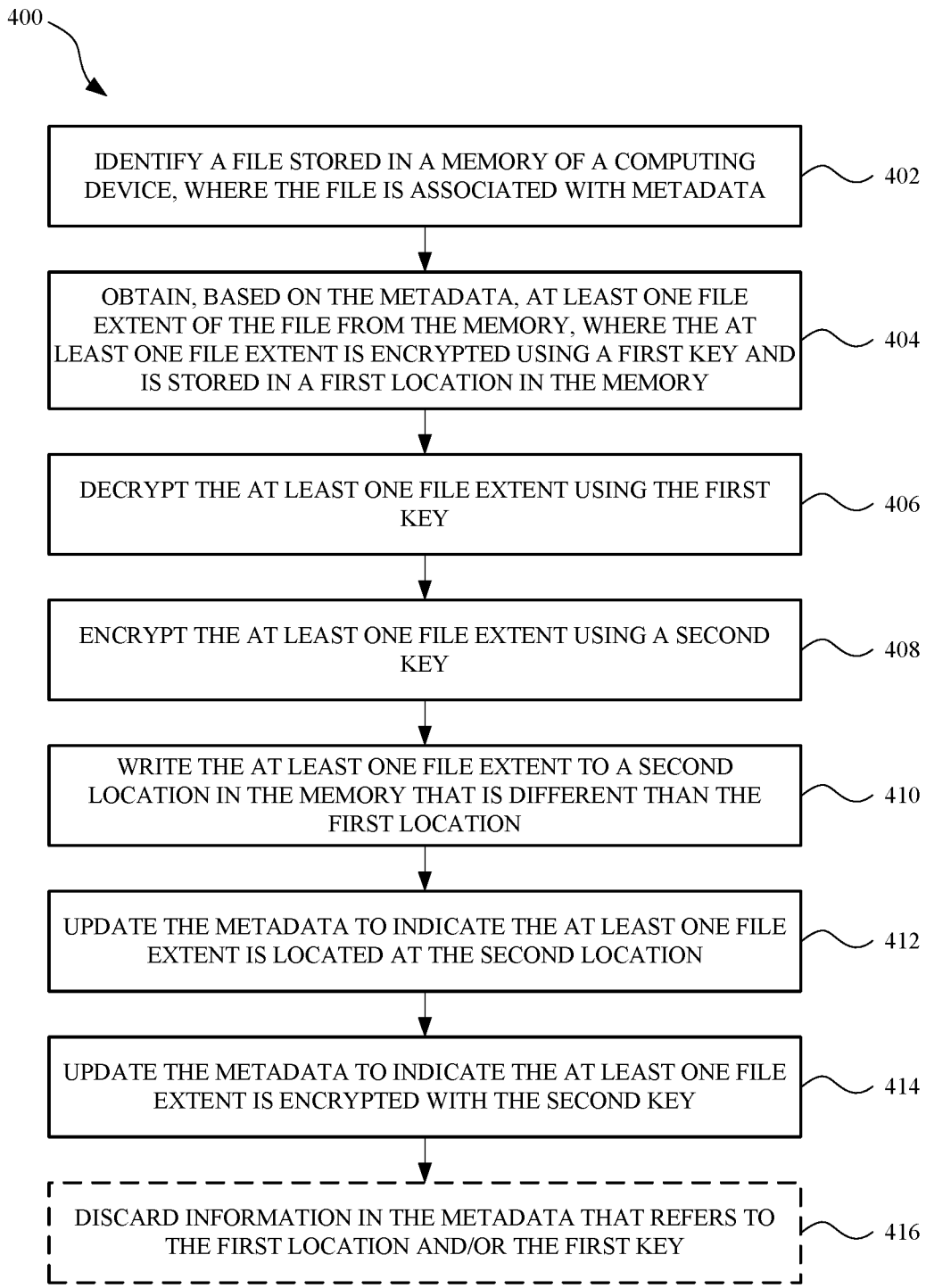
FIG. 4 illustrates a method for performing a key rolling process on at least one file extent of a file of managed by a computing device, according to some embodiments.

FIG. 4 illustrates a method 400 for performing a key rolling process on at least one file extent of a file of managed by a computing device, according to some embodiments. The method 400 can be performed by any suitable component or module (e.g., an application, a processor, a kernel of the computing device, etc.). As shown in FIG. 4, the method 400 can include a step 402 that involves identifying a file stored in a memory of the computing device 102, e.g., a file that is selected for key rolling, where the file is associated with metadata (as described herein). The file can be any suitable type of file stored by a computing device, e.g., media data, system data, graphics data, hardware data, device data, and the like. Next, a step 404 involves obtaining, based on the metadata, the at least one file extent from memory, where the at least one file extent is encrypted using a first key. At step 406, the at least one file extent is decrypted using the first key. Next, at step 408, the at least one file extent—which is now in a decrypted state—is encrypted using a second key. At step 410, the at least one file extent—which is now encrypted using the second key—is written to a second location in the memory that is different than the first location. At step 412, metadata associated with the file is updated to indicate that the at least one file extent is now located at the second location in the memory. Additionally, at step 414, the metadata associated with the file is updated to indicate that the at least one file extent is now encrypted using the second key. In some embodiments, the metadata can maintain a history of previous locations/keys associated with the one or more extents that make up the file. However, in other embodiments, this information can be discarded when possible. For example, at optional/conditional step 416, a check can be performed to determine whether there are other references within the file system that point to the first location and/or the first key. When no such other references exist, the information that refers to the first location and/or the first key can be discarded from the metadata without compromising overall coherency of the file system (e.g., the file system 112).

Figure 5:
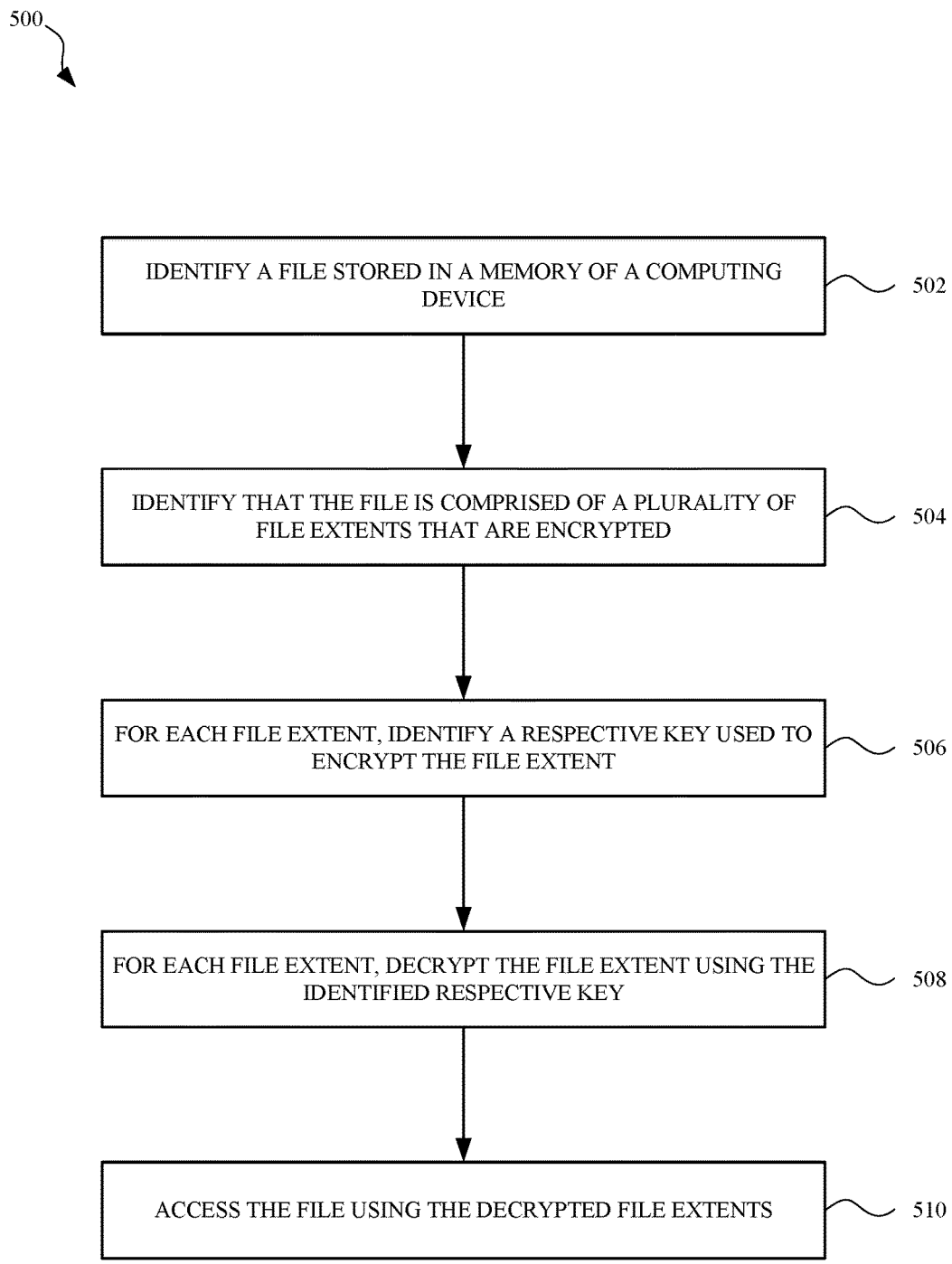
FIG. 5 illustrates a method for accessing a file that has been or is being re-encrypted in accordance with a key rolling process, according to some embodiments.

FIG. 5 illustrates a method 500 for accessing a file that has been or is being re-encrypted in accordance with a key rolling process, according to some embodiments. As shown in FIG. 5, the method 500 includes a step 502 of identifying a file stored in a memory of a computing device, e.g., the computing device 102 of FIG. 1. The method 500 can also include a step 504 that involves identifying that the file is comprised of a plurality of file extents that are encrypted. Step 506 involves, for each file extent of the plurality of file extents, identifying a respective key used to encrypt the file extent. Next, step 508 involves, for each file extent, decrypting the file extent using the identified respective key. Finally, step 510 involves accessing the file using the decrypted file extents. It is noted that the method 500 can be performed simultaneous to a key rolling program re-encrypting file extents of the file with one or more keys.

Figure 6:
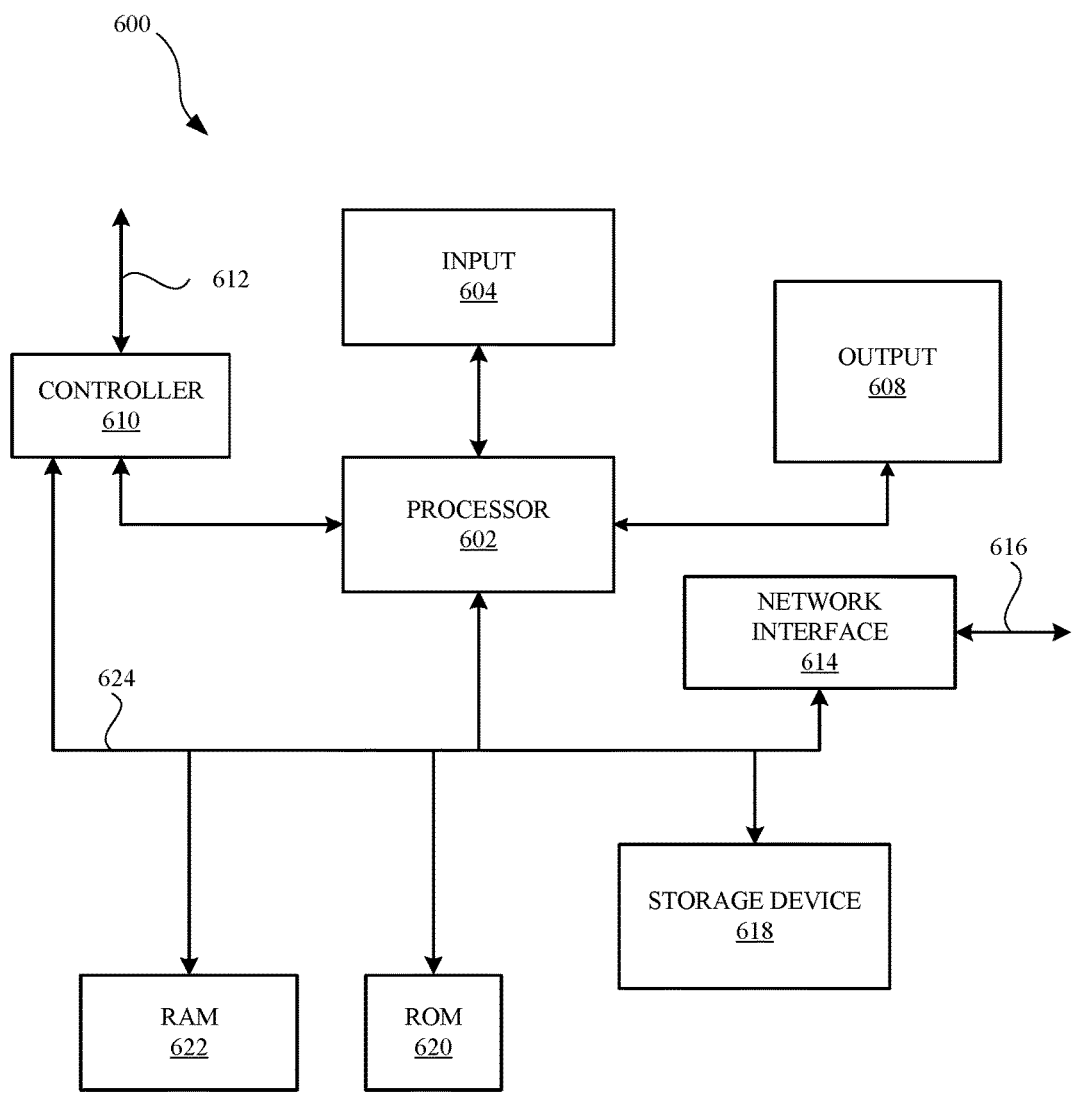
FIG. 6 is a block diagram of a computing device that can represent the components of a computing device or any other suitable device or component for realizing any of the methods, systems, apparatus, and embodiments described herein.

FIG. 6 is a block diagram of a computing device 600 that can represent the components of the computing device 102 (of FIG. 1) or any other suitable device or component for realizing any of the methods, systems, apparatus, and embodiments described herein. It will be appreciated that the components, devices or elements illustrated in and described with respect to FIG. 6 may not be mandatory and thus some may be omitted in certain embodiments. As shown in FIG. 6, the computing device 600 can include a processor 602 that represents a microprocessor, a coprocessor, circuitry and/or a controller for controlling the overall operation of computing device 600. Although illustrated as a single processor, it can be appreciated that the processor 602 can include a plurality of processors. The plurality of processors can be in operative communication with each other and can be collectively configured to perform one or more functionalities of the computing device 600 as described herein. In some embodiments, the processor 602 can be configured to execute instructions that can be stored at the computing device 600 and/or that can be otherwise accessible to the processor 602. In this manner, whether configured by hardware or by a combination of hardware and software, the processor 602 can be capable of performing operations and actions in accordance with embodiments described herein.

The computing device 600 can also include user input device 604 that allows a user of the computing device 600 to interact with the computing device 600. For example, user input device 604 can take a variety of forms, such as a button, keypad, dial, touch screen, audio input interface, visual/image capture input interface, input in the form of sensor data, etc. Still further, the computing device 600 can include an output 608 that can be controlled by processor 602. The output 608 can include a display device, audio device, haptic feedback device, or any other output device suitable for providing output to a user of a device. Controller 610 can be used to interface with and control different equipment through equipment control bus 612. The computing device 600 can also include a network/bus interface 614 that couples to data link 616. Data link 616 can allow the computing device 600 to couple to a host computer or to accessory devices. The data link 616 can be provided over a wired connection or a wireless connection. In the case of a wireless connection, network/bus interface 614 can include a wireless transceiver.

The computing device 600 can also include a storage device 618, which can have a single disk or a plurality of disks (e.g., hard drives) and a storage management module that manages one or more partitions (also referred to herein as "logical volumes") within the storage device 618. In some embodiments, the storage device 618 can include flash memory, semiconductor (solid state) memory or the like. Still further, the computing device 600 can include Read-Only Memory (ROM) 620 and Random Access Memory (RAM) 622. The ROM 620 can store programs, code, instructions, utilities or processes to be executed in a non-volatile manner. The RAM 622 can provide volatile data storage, and store instructions related to components of the storage management module that are configured to carry out the various techniques described herein. The computing device 600 can further include data bus 624. Data bus 624 can facilitate data and signal transfer between at least processor 602, controller 610, network/bus interface 614, storage device 618, ROM 620, and RAM 622.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable storage medium. The computer readable storage medium can be any data storage device that can store data, which can thereafter be read by a computer system. Examples of the computer readable storage medium include read-only memory, random-access memory, CD-ROMs, HDDs, DVDs, magnetic tape, and optical data storage devices. The computer readable storage medium can also be distributed over network-coupled computer systems so that the computer readable code is stored and executed in a distributed fashion. In some embodiments, the computer readable storage medium can be non-transitory.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for re-encrypting file extents of files at a computing device, the method comprising, by a processor of the computing device:
receiving a request to update an encryption scheme applied to a file, wherein:
the file is comprised of a plurality of file extents,
the file is included in a plurality of files accessible to the computing device, and
each file of the plurality of files is associated with a respective metadata;
identifying, based on the respective metadata associated with the file, a subset of file extents among the plurality of file extents, wherein each file extent of the subset of file extents is encrypted using a first encryption key that is to be updated; and
for each file extent of the subset of file extents:
reserving a respective portion of a memory of the computing device, wherein the respective portion of the memory is sized in accordance with a size of the file extent,
decrypting the file extent using the first encryption key to produce a decrypted file extent,
encrypting the decrypted file extent using a second encryption key that is different than the first encryption key to produce a new encrypted file extent,
storing the new encrypted file extent into the respective portion of memory, and
updating the respective metadata associated with the file to indicate that the file extent is encrypted with the second encryption key and is stored in the respective portion of memory.

2. The method of claim 1, wherein at least one other file extent of the plurality of file extents is encrypted using a third encryption key that is different from both the first encryption key and the second encryption key.

3. The method of claim 1, further comprising, for each file extent of the subset of file extents:
prior to decrypting the file extent, writing the file extent to a new memory span that is different than a current memory span of the file extent.

4. The method of claim 3, further comprising:
updating the respective metadata associated with the file to reference the new memory span.

5. The method of claim 3, further comprising:
designating the current memory span as free space.

6. The method of claim 1, wherein, for each file extent of the subset of file extents, encrypting the file extent comprises locking the file extent from being accessed until the respective metadata associated with the file is updated.

7. The method of claim 1, further comprising, for each file extent of the subset of file extents:
permitting, while encrypting the file extent using the second encryption key, an application of the computing device to access other file extents included in the plurality of file extents.

8. A non-transitory computer readable storage medium configured to store instructions that, when executed by a processor included in a computing device, cause the computing device to re-encrypt file extents of files at the computing device, by carrying out steps that include:
receiving a request to update an encryption scheme applied to a file, wherein:
the file is comprised of a plurality of file extents,
the file is included in a plurality of files accessible to the computing device, and
each file of the plurality of files is associated with a respective metadata;
identifying, based on the respective metadata associated with the file, a subset of file extents among the plurality of file extents, wherein each file extent of the subset of file extents is encrypted using a first encryption key that is to be updated; and
for each file extent of the subset of file extents:
reserving a respective portion of a memory of the computing device, wherein the respective portion of the memory is sized in accordance with a size of the file extent,
decrypting the file extent using the first encryption key to produce a decrypted file extent,
encrypting the decrypted file extent using a second encryption key that is different than the first encryption key to produce a new encrypted file extent,
storing the new encrypted file extent into the respective portion of memory, and
updating the respective metadata associated with the file to indicate that the file extent is encrypted with the second encryption key and is stored in the respective portion of memory.

9. The non-transitory computer readable storage medium of claim 8, wherein at least one other file extent of the plurality of file extents is encrypted using a third encryption key that is different from both the first encryption key and the second encryption key.

10. The non-transitory computer readable storage medium of claim 8, wherein, for each file extent of the subset of file extents, encrypting the file extent comprises locking the file extent from being accessed until the respective metadata associated with the file is updated.

11. The non-transitory computer readable storage medium of claim 8, wherein the request is received in response to the computing device being connected to an external power supply.

12. The non-transitory computer readable storage medium of claim 8, wherein the file is associated with a group of users, and the request is received in response to a user leaving the group.

13. The non-transitory computer readable storage medium of claim 8, wherein the first encryption key and the second encryption key have different times of origination.

14. A computing device configured to re-encrypt file extents of files, the computing device comprising a processor configured to cause the computing device to carry out steps that include:
receiving a request to update an encryption scheme applied to a file, wherein:
the file is comprised of a plurality of file extents,
the file is included in a plurality of files accessible to the computing device, and
each file of the plurality of files is associated with a respective metadata;
identifying, based on the respective metadata associated with the file, a subset of file extents among the plurality of file extents, wherein each file extent of the subset of file extents is encrypted using a first encryption key that is to be updated; and
for each file extent of the subset of file extents:
reserving a respective portion of a memory of the computing device, wherein the respective portion of the memory is sized in accordance with a size of the file extent,
decrypting the file extent using the first encryption key to produce a decrypted file extent,
encrypting the decrypted file extent using a second encryption key that is different than the first encryption key to produce a new encrypted file extent,
storing the new encrypted file extent into the respective portion of memory, and
updating the respective metadata associated with the file to indicate that the file extent is encrypted with the second encryption key and is stored in the respective portion of memory.

15. The computing device of claim 14, wherein at least one other file extent of the plurality of file extents is encrypted using a third encryption key that is different from both the first encryption key and the second encryption key.

16. The computing device of claim 14, wherein the steps further include, for each file extent of the subset of file extents:
prior to decrypting the file extent, writing the file extent to a new memory span that is different than a current memory span of the file extent.

17. The computing device of claim 16, wherein the steps further include:
updating the respective metadata associated with the file to reference the new memory span.

18. The computing device of claim 16, wherein the steps further include:
designating the current memory span as free space.

19. The computing device of claim 14, wherein, for each file extent of the subset of file extents, encrypting the file extent comprises locking the file extent from being accessed until the respective metadata associated with the file is updated.

20. The computing device of claim 14, wherein the steps further include, for each file extent of the subset of file extents:

permitting, while encrypting the file extent using the second encryption key, an application of the computing device to access other file extents included in the plurality of file extents.

\* \* \* \* \*